United States Patent
Zeng

(10) Patent No.: US 9,798,073 B2
(45) Date of Patent: Oct. 24, 2017

(54) LIGHT GUIDE PLATE COMPRISING A CONNECTION LAYER DISPOSED BETWEEN FIRST AND SECOND LIGHT GUIDE LAYERS, BACKLIGHT MODULE AND DISPLAY DEVICE

(71) Applicant: Wuhan China Star Optoelectronics Technology Co., Ltd., Wuhan, Hubei (CN)

(72) Inventor: Jie Zeng, Guangdong (CN)

(73) Assignee: Optoelectronics Technology Co., Ltd, Wuhan, Hubei (CN)

(*) Notice: Subject to any disclaimer, the term of this patent is extended or adjusted under 35 U.S.C. 154(b) by 237 days.

(21) Appl. No.: 14/774,184

(22) PCT Filed: Jul. 17, 2015

(86) PCT No.: PCT/CN2015/084281
§ 371 (c)(1),
(2) Date: Sep. 10, 2015

(87) PCT Pub. No.: WO2016/206148
PCT Pub. Date: Dec. 29, 2016

(65) Prior Publication Data
US 2017/0139116 A1 May 18, 2017

(30) Foreign Application Priority Data
Jun. 24, 2015 (CN) .......................... 2015 1 0353986

(51) Int. Cl.
*F21V 8/00* (2006.01)

(52) U.S. Cl.
CPC ......... *G02B 6/0076* (2013.01); *G02B 6/0046* (2013.01); *G02B 6/0055* (2013.01); *G02B 6/0058* (2013.01)

(58) Field of Classification Search
CPC .. G02B 6/0076; G02B 6/0046; G02B 6/0058; G02B 6/0011; G02B 6/0015;
(Continued)

(56) References Cited

U.S. PATENT DOCUMENTS

2007/0052882 A1* 3/2007 Hwang ................ G02B 6/0056
349/62
2011/0255305 A1* 10/2011 Chen .................... G02B 6/0035
362/619

(Continued)

*Primary Examiner* — Paul Lee
(74) *Attorney, Agent, or Firm* — Andrew C. Cheng

(57) ABSTRACT

A light guide plate, wherein refractive indexes of the first light guide layer, the connection layer and the second light guide layer decreases in sequence; the first light guide layer comprises a first incident surface, a first angular surface and an illuminating surface; the second light guide layer comprises a first lateral surface, a bottom surface and a second angular surface; the connection layer comprises a main reflective layer and a sub reflective layer, and mesh dots of the main reflective layer and the sub reflective layer are positioned in staggered manner; the first angular surface is laminated with the first reflective surface, and the second angular surface is laminated with a back surface of the second reflective surface, and the illuminating surface is parallel with the bottom surface. The present invention further discloses a backlight module and a display device.

19 Claims, 2 Drawing Sheets

(58) Field of Classification Search
CPC .. G02B 6/0016; G02B 6/0023; G02B 6/0025; G02B 6/0026; G02F 2001/133616
See application file for complete search history.

(56) References Cited

U.S. PATENT DOCUMENTS

| | | | | |
|---|---|---|---|---|
| 2011/0262092 | A1* | 10/2011 | Large | G02B 6/0046 385/129 |
| 2012/0120679 | A1* | 5/2012 | Shih | C09D 11/03 362/609 |
| 2012/0257412 | A1* | 10/2012 | Yeom | B05D 5/06 362/607 |
| 2013/0215646 | A1* | 8/2013 | Kusuura | G02B 6/0048 362/612 |

* cited by examiner

LIGHT GUIDE PLATE COMPRISING A CONNECTION LAYER DISPOSED BETWEEN FIRST AND SECOND LIGHT GUIDE LAYERS, BACKLIGHT MODULE AND DISPLAY DEVICE

CROSS REFERENCE

This application claims the priority of Chinese Patent Application No. 201510353986.5, entitled "Light guide plate, backlight module and display device", filed on Jun. 24, 2015, the disclosure of which is incorporated herein by reference in its entirety.

FIELD OF THE INVENTION

The present invention relates to a liquid crystal display field, and more particularly to a light guide plate, a backlight module and a display device.

BACKGROUND OF THE INVENTION

The liquid crystal display device is the main stream flat panel display device technology in the present market. All display devices need backlight to be the light source for illuminating the liquid crystal display device. The traditional backlight module comprises a backlight source consisted of LEDs, and as the light of the backlight module passes through the light guide plate, the light source is converted into a surface light source to for illumination, and after the lighting uniformity of the diffuser, the light exits from the backlight module. After the liquid crystal panel, the image we want can be shown. The light guide plate is an important component in the backlight module.

The working principle of the present light guide plate is that the light emitted from the lamp is absorbed with the optical grade Acrylic sheet material, and after the light irradiates at the respective light guide mesh dots, the light guide plate can uniformly emits light with light guide mesh dots of various densities and dimensions. However, part of the light will be refracted out from the bottom of the light guide plate. Therefore, the reflector is necessary to reflect the light escaping from the bottom surface back into the light guide plate for raising the usage efficiency of the light. Still part of the light will vertically exits the light guide plate from the tops of the mesh dots. In other words, the light guide plate combined with the reflector remains having the light leakage. The light source cannot be fully used.

SUMMARY OF THE INVENTION

An objective of the present invention is to provide a light guide plate and a backlight module to solve the technical issue of light leak of the light guide plate.

The present invention further provides a display device.

The present invention provides a light guide plate, comprising a first light guide layer, a second light guide layer and a connection layer, and refractive indexes of the first light guide layer, the connection layer and the second light guide layer decreases in sequence; the first light guide layer comprises a first incident surface, a first angular surface and an illuminating surface, and the first angular surface is connected with the first incident surface and the illuminating surface; the second light guide layer comprises a first lateral surface, a bottom surface and a second angular surface connecting the bottom surface and the first lateral surface; the connection layer comprises a main reflective layer and a sub reflective layer stacking up with the main reflective layer, and mesh dots of the main reflective layer and mesh dots of the sub reflective layer are positioned in staggered manner, and a first reflective surface constructed by the mesh dots of the main reflective layer and a second reflective surface constructed by the mesh dots of the sub reflective layer are parallel and have the same orientation; the connection layer is fixed between the first light guide layer and the second light guide layer, and the first angular surface is laminated with the first reflective surface, and the second angular surface is laminated with a back surface of the second reflective surface, and the illuminating surface is parallel with the bottom surface.

The connection layer is an unitary thin plate, and the mesh dots in the main reflective layer and the mesh dots in the sub reflective layer are positioned in the connection layer and located on two opposite outer surfaces respectively close to the connection layer.

The connection layer further comprises a second incident surface and a second lateral surface opposite to the second incident surface, and the second incident surface and the second lateral surface connects the first reflective surface and a surface opposite to the second reflective layer.

The first incident surface and the second incident surface are located in the same plane, and are connected to form an incident surface of the light guide plate; the first lateral surface and the second lateral surface are located in the same plane, and are connected to form a lateral surface opposite to the incident surface.

A cross section of the first light guide layer perpendicular to a direction of the first incident surface is a right-angled triangle; a cross section of the second light guide layer perpendicular to a direction of the first lateral surface is a right-angled triangle.

The first incident surface and the first angular surface are positioned with an included angle, and the included angle is between 30-60 degrees.

Dimension and density of the mesh dots in the main reflective layer gradually increase along with a distance increase away from the first incident surface.

The present invention provides a backlight module, and the backlight module comprises a glue frame, a backlight source, an optical thin film and the light guide plate, and the light guide plate, the backlight source, and the optical thin film are positioned in the glue frame, and the backlight source is positioned at the first incident surface of the light guide plate, and the optical thin film is positioned on the illuminating surface.

The present invention provides a display device, comprising the backlight module according to claim 10 and a liquid crystal panel, and the liquid crystal panel is installed at one side of the backlight module having the optical thin film.

The light guide plate is formed by the first light guide layer, the second light guide layer and the connection layer sandwiched between the first light guide layer and the second light guide layer. The connection layer reflects the light at the light leak positions of the first incident light surface back to the first light guide layer, and then the light pass through the illuminating surface to diminish the waste of the light source and raise the output coefficient of the light.

BRIEF DESCRIPTION OF THE DRAWINGS

In order to more clearly illustrate the embodiments of the present invention, the following figures will be described in the embodiments are briefly introduced. It is obvious that the drawings are only some embodiments of the present invention, those of ordinary skill in this field can obtain other figures according to these figures without paying the premise.

DETAILED DESCRIPTION OF PREFERRED EMBODIMENTS

For better explaining the technical solution and the effect of the present invention, the present invention will be further described in detail with the accompanying drawings in the specific embodiments.

Figure 1:
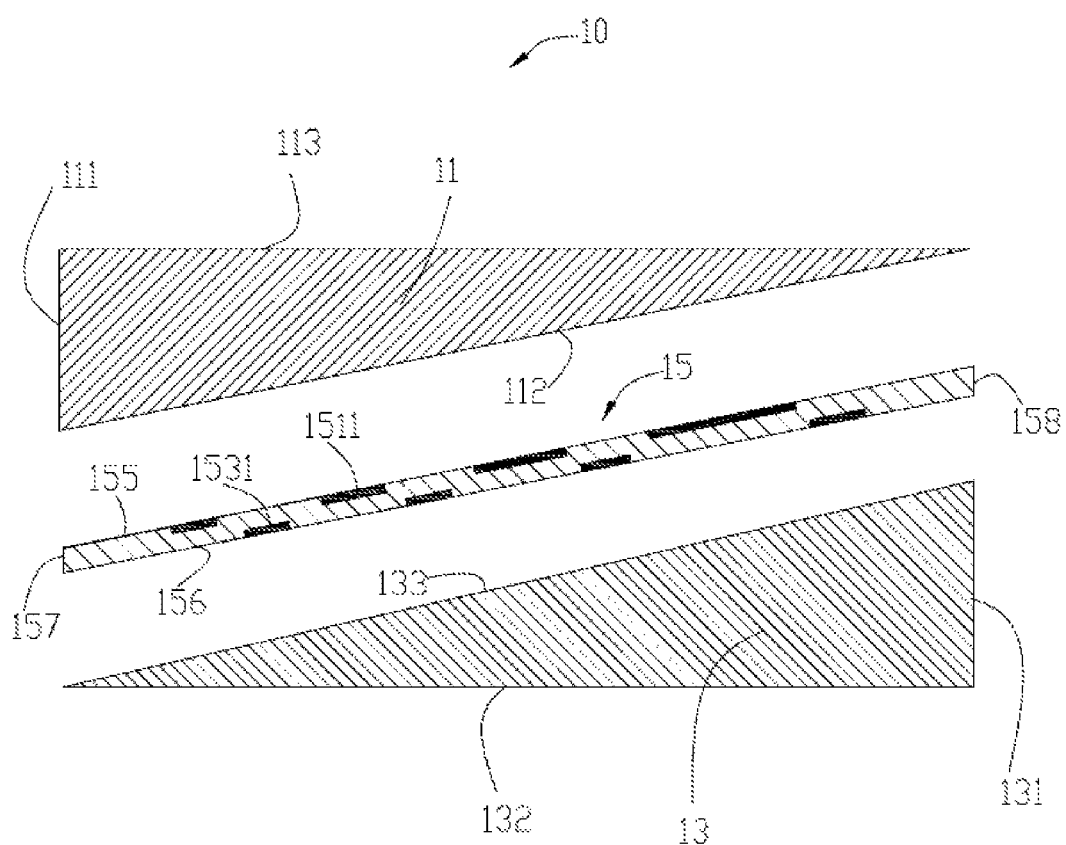
FIG. 1 is a sectional diagram of a light guide plate in the preferred embodiment according to the present invention, wherein the light guide plate is in an exploded state.
Figure 2:
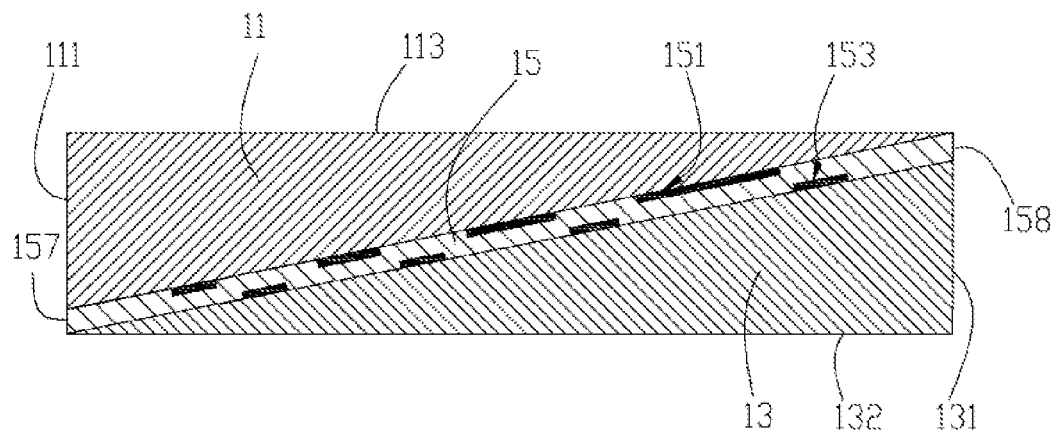
FIG. 2 is a sectional diagram of the light guide plate of the present invention after assembly.

Please refer to FIG. 1 and FIG. 2. The preferred embodiment of the present invention provides a light guide plate 10, and the light guide plate 10 comprises a first light guide layer 11, a second light guide layer 13 and a connection layer 15, and refractive indexes of the first light guide layer 11, the connection layer 15 and the second light guide layer 13 decreases in sequence.

The first light guide layer 11 comprises a first incident surface 111, a first angular surface 112 and an illuminating surface 113, and the first angular surface 112 is connected with the first incident surface 111 and the illuminating surface 113; the second light guide layer 13 comprises a first lateral surface 131, a bottom surface 132 and a second angular surface 133 connecting the bottom surface 132 and the first lateral surface 131.

The connection layer 15 comprises a main reflective layer 151 and a sub reflective layer 153 stacking up with the main reflective layer 151, and mesh dots 1511 of the main reflective layer 151 and mesh dots 1531 of the sub reflective layer 153 are positioned in staggered manner, and a first reflective surface constructed by the mesh dots 1511 of the main reflective layer 151 and a second reflective surface constructed by the mesh dots 1531 of the sub reflective layer 153 are parallel and have the same orientation. The connection layer 15 is fixed between the first light guide layer 11 and the second light guide layer 13, and the first angular surface 112 is laminated with the first reflective surface, and the second angular surface 133 is laminated with a back surface of the second reflective surface.

In this embodiment, a cross section of the first light guide layer 11 perpendicular to a direction of the first incident surface 111 is a right-angled triangle; a cross section of the second light guide layer 13 perpendicular to a direction of the first lateral surface 131 is a right-angled triangle. That is to say, the first light guide layer 11 and the second light guide layer 13 are right-angled triangle thin plates. The first angular surface 112, the second angular surface 133 are angular surfaces of triangles. After the first light guide layer 11 and the second light guide layer 13 are connected and fixed with the connection layer, the illuminating surface 113 is positioned parallel and opposite with the bottom surface 132, and the first lateral surface 131 is positioned parallel and opposite with the first incident surface 111, and the first light guide layer 11, the second light guide layer 13 and the connection layer 15 construct a rectangular sheet light guide plate 10.

Furthermore, the connection layer 15 is an unitary thin plate, which is mainly manufactured by an optical grade Acrylic sheet or PC material. The mesh dots 1511 in the main reflective layer 151 and the mesh dots 1531 in the sub reflective layer 153 are positioned in the connection layer 15 and located on two opposite outer surfaces 155, 156 respectively close to the connection layer 15. Namely, the mesh dots 1511 and the mesh dots 1531 are located in the connection layer 15.

Specifically, the first reflective surface is the outer surface 155. The second reflective surface is positioned in the connection layer 15 and parallel with the first reflective surface, and is oppositely positioned to the outer surface 156. When the light enter the connection layer 15, the reflection is executed by the main reflective layer 151, and the leaked light passing through the main reflective layer 151 is reflected back to the illuminating surface 113 by the second reflective surface. Thus, the light is fully used to guarantee the light guide efficiency of the light guide plate.

Furthermore, the connection layer 15 further comprises a second incident surface 157 and a second lateral surface 158 opposite to the second incident surface 157, and the second incident surface 157 and the second lateral surface 158 connects the first reflective surface and a surface opposite to the second reflective layer of the sub reflective layer 153, i.e. the outer surface 156. Specifically, the first angular surface 112 is laminated with the first reflective surface, and the second angular surface 133 is laminated with a back surface of the second reflective surface, and the illuminating surface 113 is positioned parallel and opposite with the bottom surface 132, and the first lateral surface 131 is positioned parallel and opposite with the first incident surface 111, and the first light guide layer 11, the second light guide layer 13 and the connection layer 15 construct a rectangular sheet light guide plate 10; wherein the first incident surface 111 and the second incident surface 157 are located in the same plane, and are connected to form an incident surface of the light guide plate 10; the first lateral surface 131 and the second lateral surface 158 are located in the same plane, and are connected to form a lateral surface opposite to the incident surface.

Furthermore, the first incident surface 111 and the first angular surface 112 are positioned with an included angle, and the included angle A is between 30-60 degrees. As long as the included angle A can make the main reflective layer 151 realize total reflection.

Furthermore, dimension and density of the mesh dots 1511 in the main reflective layer 151 gradually increase along with a distance increase away from the first incident surface 111. In other words, the dimensions of the mesh dots 1511 in the same plane in the main reflective layer 151 are larger when the distances relative to the first incident surface 111 are farther, and meanwhile, the density of the mesh dots is larger. When the optical fiber enters from the first incident surface 111, it can be ensured that the main reflective layer 151 far away from the incident surface can have the same light diffusion effect as those of the positions close to the incident surface.

Figure 3:
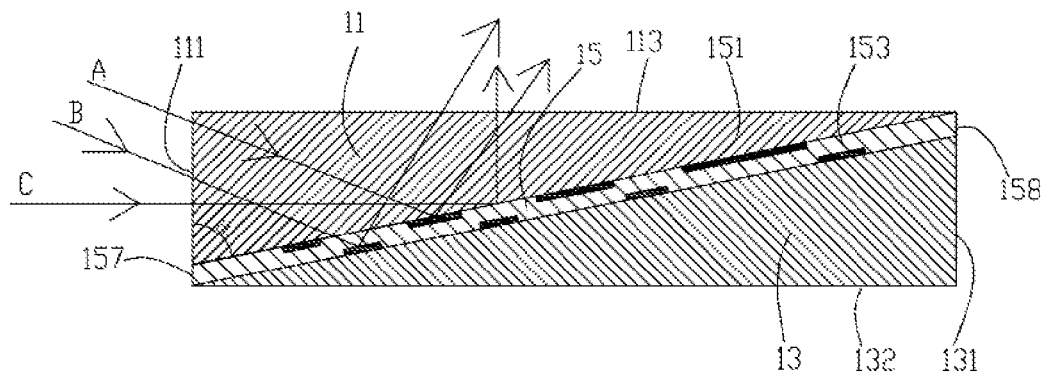
FIG. 3 is a diagram of light passing through the light guide plate shown in FIG. 2.

Please refer to FIG. 3, which is illustrated for explain the light guide effect of the light guide plate. As the light guide plate 10 guides the light, the light of the light source enters the first light guide layer 11 and the connection layer 15 from the first incident surface 111 and the second incident surface 157. The light which can make the light guide plate generates light leak may enter into the light guide plate roughly from three angles: the light A, light B and light C as shown in figure, and the light A is obliquely incident into the first reflective surface formed by the mesh dots 1511 of the main reflective layer 151 relative to the first incident surface 111, and is reflected out from the illuminating surface 113 through the first reflective surface. The light B is the light exposed from the mesh dots 1511 of the main reflective layer 151, and is incident on the second reflective surface of the sub reflective layer 153, and then is reflected back to the first light guide layer 11 by the second reflective surface and exists the illuminating surface 113. The light C vertically enters the first light guide layer 11 from the first incident surface 111 and is reflected with the first reflective layer. Because the refractive index of the first light guide layer 11 is smaller than the refractive index of the main reflective layer 151, and the included angle A exists, the light C can be totally reflected out of the illuminating surface 113. Therefore, the light which may cause light leak is mostly reflected back to the first light guide layer 11 after passing through the connection layer 15 to the enormous waste of the light and raise the output coefficient of the light.

The light guide plate 10 is formed by the first light guide layer 11, the second light guide layer 13 and the connection layer 15 sandwiched between the first light guide layer 11 and the second light guide layer 13. The connection layer 15 reflects the light at the light leak positions of the first incident surface back to the first light guide layer 11, and then the light pass through the illuminating surface 113 to diminish the waste of the light source and raise the output coefficient of the light.

The present invention further provides a backlight module (not shown), which comprises a glue frame, a backlight source, an optical thin film and the light guide plate, and the light guide plate, the backlight source, and the optical thin film are positioned in the glue frame, and the backlight source is positioned at the first incident surface of the light guide plate, and the optical thin film is positioned on the illuminating surface.

After the light of the light source enter the light guide plate 10 from the first incident surface 111 and the second incident surface 157 of the light guide plate 10, according to the aforesaid illustrated analysis, the normal light penetrates out of the illuminating surface 113 after lighting uniformity, and the light at the angle of the other similar light A, light B and light C are reflected out of the illuminating surface by the connection layer 15, which fulfills the capacity of the light provide by the backlight module. Meanwhile, a reflective plate does not require to be additionally provided to save material.

The present invention further provides a display device (not shown), comprising the backlight module according to claim 10 and a liquid crystal panel, and the liquid crystal panel is installed at one side of the backlight module having the optical thin film.

Above are only specific embodiments of the present invention, the scope of the present invention is not limited to this, and to any persons who are skilled in the art, change or replacement which is easily derived should be covered by the protected scope of the invention. Thus, the protected scope of the invention should go by the subject claims.

What is claimed is:

1. A light guide plate, wherein the light guide plate comprises a first light guide layer, a second light guide layer and a connection layer, and refractive indexes of the first light guide layer, the connection layer and the second light guide layer decreases in sequence; the first light guide layer comprises a first incident surface, a first angular surface and an illuminating surface, and the first angular surface is connected with the first incident surface and the illuminating surface; the second light guide layer comprises a first lateral surface, a bottom surface and a second angular surface connecting the bottom surface and the first lateral surface; the connection layer comprises a main reflective layer and a sub reflective layer stacking up with the main reflective layer, and mesh dots of the main reflective layer and mesh dots of the sub reflective layer are positioned in staggered manner, and a first reflective surface constructed by the mesh dots of the main reflective layer and a second reflective surface constructed by the mesh dots of the sub reflective layer are parallel and have the same orientation; the connection layer is fixed between the first light guide layer and the second light guide layer, and the first angular surface is laminated with the first reflective surface, and the second angular surface is laminated with a back surface of the second reflective surface, and the illuminating surface is parallel with the bottom surface.

2. The light guide plate according to claim 1, wherein the connection layer is an unitary thin plate, and the mesh dots in the main reflective layer and the mesh dots in the sub reflective layer are positioned in the connection layer and located on two opposite outer surfaces respectively close to the connection layer.

3. The light guide plate according to claim 2, wherein the connection layer further comprises a second incident surface and a second lateral surface opposite to the second incident surface, and the second incident surface and the second lateral surface connects the first reflective surface and a surface opposite to the second reflective layer.

4. The light guide plate according to claim 3, wherein the first incident surface and the second incident surface are located in the same plane, and are connected to form an incident surface of the light guide plate; the first lateral surface and the second lateral surface are located in the same plane, and are connected to form a lateral surface opposite to the incident surface.

5. The light guide plate according to claim 4, wherein a cross section of the first light guide layer perpendicular to a direction of the first incident surface is a right-angled triangle; a cross section of the second light guide layer perpendicular to a direction of the first lateral surface is a right-angled triangle.

6. The light guide plate according to claim 1, wherein the first incident surface and the first angular surface are positioned with an included angle, and the included angle is between 30-60 degrees.

7. The light guide plate according to claim 5, wherein the first incident surface and the first angular surface are positioned with an included angle, and the included angle is between 30-60 degrees.

8. The light guide plate according to claim 1, wherein dimension and density of the mesh dots in the main reflective layer gradually increase along with a distance increase away from the first incident surface.

9. The light guide plate according to claim 5, wherein dimension and density of the mesh dots in the main reflective layer gradually increase along with a distance increase away from the first incident surface.

10. A backlight module, comprising a glue frame, a backlight source, an optical thin film and a light guide plate, and the light guide plate comprises a first light guide layer, a second light guide layer and a connection layer, and refractive indexes of the first light guide layer, the connection layer and the second light guide layer decreases in sequence; the first light guide layer comprises a first incident surface, a first angular surface and an illuminating surface, and the first angular surface is connected with the first incident surface and the illuminating surface; the second light guide layer comprises a first lateral surface, a bottom surface and a second angular surface connecting the bottom surface and the first lateral surface; the connection layer comprises a main reflective layer and a sub reflective layer stacking up with the main reflective layer, and mesh dots of the main reflective layer and mesh dots of the sub reflective layer are positioned in staggered manner, and a first reflective surface constructed by the mesh dots of the main reflective layer and a second reflective surface constructed by the mesh dots of the sub reflective layer are parallel and have the same orientation; the connection layer is fixed between the first light guide layer and the second light guide layer, and the first angular surface is laminated with the first reflective surface, and the second angular surface is laminated with a back surface of the second reflective surface, and the illuminating surface is parallel with the bottom surface, and the light guide plate, the backlight source, and the optical thin film are positioned in the glue frame, and the backlight source is positioned at the first incident surface of the light guide plate, and the optical thin film is positioned on the illuminating surface.

11. The backlight module according to claim 10, wherein the connection layer is an unitary thin plate, and the mesh dots in the main reflective layer and the mesh dots in the sub reflective layer are positioned in the connection layer and located on two opposite outer surfaces respectively close to the connection layer.

12. The backlight module according to claim 11, wherein the connection layer further comprises a second incident surface and a second lateral surface opposite to the second incident surface, and the second incident surface and the second lateral surface connects the first reflective surface and a surface opposite to the second reflective layer.

13. The backlight module according to claim 12, wherein the first incident surface and the second incident surface are located in the same plane, and are connected to form an incident surface of the light guide plate; the first lateral surface and the second lateral surface are located in the same plane, and are connected to form a lateral surface opposite to the incident surface.

14. The backlight module according to claim 13, wherein a cross section of the first light guide layer perpendicular to a direction of the first incident surface is a right-angled triangle; a cross section of the second light guide layer perpendicular to a direction of the first lateral surface is a right-angled triangle.

15. The backlight module according to claim 10, wherein the first incident surface and the first angular surface are positioned with an included angle, and the included angle is between 30-60 degrees.

16. The backlight module according to claim 10, wherein dimension and density of the mesh dots in the main reflective layer gradually increase along with a distance increase away from the first incident surface.

17. The backlight module according to claim 14, wherein the first incident surface and the first angular surface are positioned with an included angle, and the included angle is between 30-60 degrees.

18. The backlight module according to claim 14, wherein dimension and density of the mesh dots in the main reflective layer gradually increase along with a distance increase away from the first incident surface.

19. A display device, comprising the backlight module according to claim 10 and a liquid crystal panel, and the liquid crystal panel is installed at one side of the backlight module having the optical thin film.

* * * * *

UNITED STATES PATENT AND TRADEMARK OFFICE
CERTIFICATE OF CORRECTION

PATENT NO. : 9,798,073 B2
APPLICATION NO. : 14/774184
DATED : October 24, 2017
INVENTOR(S) : Jie Zeng It is certified that error appears in the above-identified patent and that said Letters Patent is hereby corrected as shown below:

On the Title Page

Item (73) Assignee should read:
(73) Assignee: Wuhan China Star Optoelectronics Technology Co., Ltd, Wuhan, Hubei, China Signed and Sealed this
Twelfth Day of December, 2017

Joseph Matal
*Performing the Functions and Duties of the*
*Under Secretary of Commerce for Intellectual Property and*
*Director of the United States Patent and Trademark Office*